UNITED STATES PATENT OFFICE.

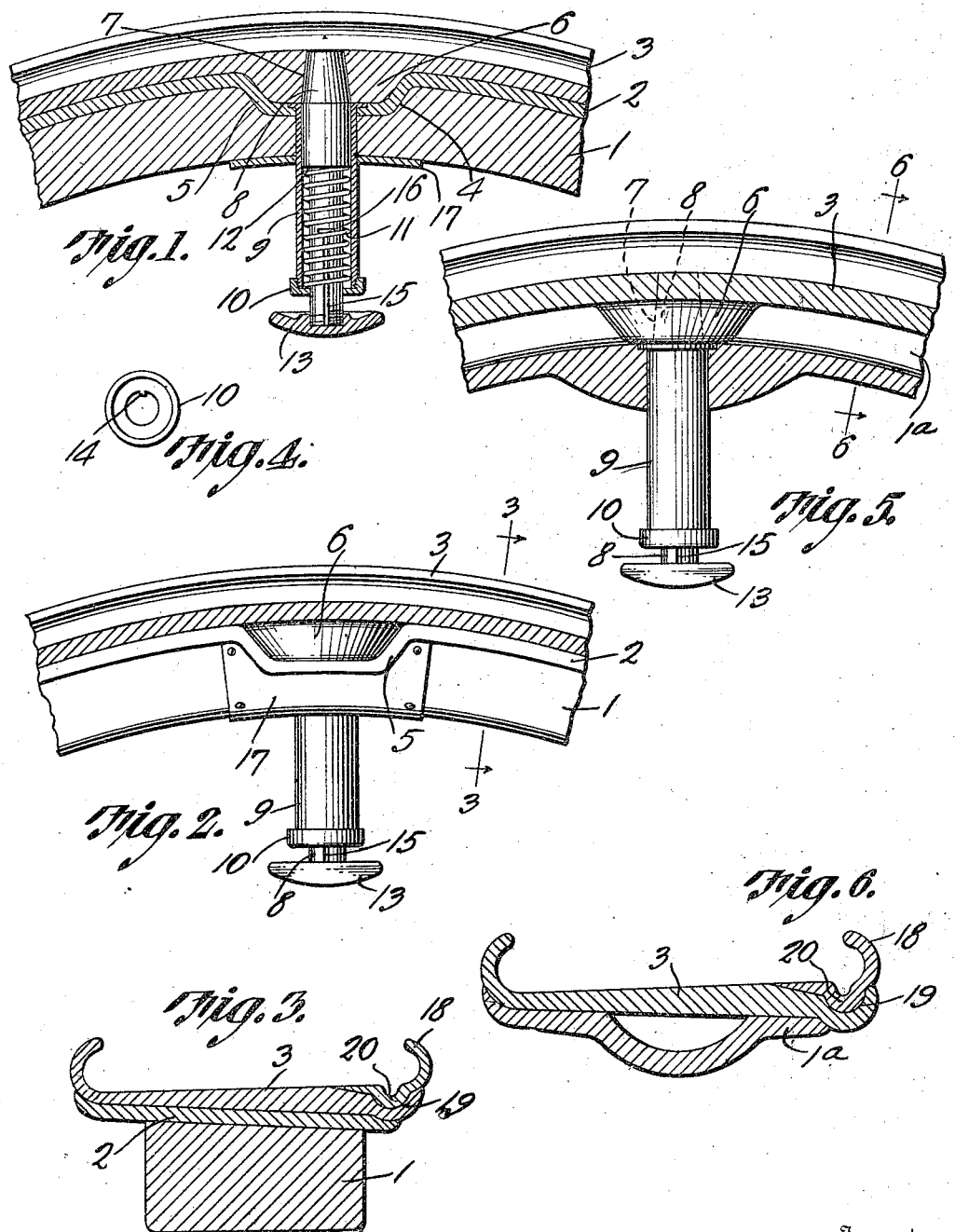

ALBERT J. GLAU, OF SAN ARDO, CALIFORNIA.

DISMOUNTABLE RIM.

1,191,402.      Specification of Letters Patent.      Patented July 18, 1916.

Application filed June 7, 1915. Serial No. 32,783.

*To all whom it may concern:*

Be it known that I, ALBERT J. GLAU, a citizen of the United States, residing at San Ardo, in the county of Monterey and State of California, have invented a new and useful Dismountable Rim, of which the following is a specification.

My invention relates to a dismountable rim for automobiles and motorcycles, the object of my invention being to provide a rim of this character having novel fastening and releasing means and which may be more readily and quickly detached to permit of repairs to the tire than is possible with rims in use at the present time.

I attain the objects of my invention by the mechanism illustrated in the accompanying drawings, in which—

Figure 1 is a section illustrating my invention; Fig. 2 is an elevational view with a portion of the rim shown in section; Fig. 3 is a cross section on line 3—3 of Fig. 2; Fig. 4 is a detail of cap member 10; Fig. 5 is an elevational view of a modified form of the invention, partly in section, Fig. 6 is a cross section on line 6—6 of Fig. 5, the latter two views illustrating the modified form of the invention applied to lighter tires.

Similar characters of reference indicate similar parts throughout the several views.

Referring to the accompanying drawings, I provide a wooden felly 1, over which is mounted a metal band 2, while over band 2 is mounted the tire engaging rim 3. I provide a boss or enlargement 6 at suitable intervals in rim 3; the metal band 2 being provided with a corresponding depressed portion 5 into which boss 6 extends; and wooden felly 1 being provided with a corresponding recessed portion 4 for portion 5 of the band 2. A tapered recessed portion 7 is provided in boss 6, into which projects the tapered end of plunger 8, as illustrated in Fig. 1. The plunger 8 is mounted in casing 9. Casing 9 is covered by cap 10, which is provided with a projection 14, adapted to engage in a grooved portion 15 extending lengthwise of plunger 8, and opening into a grooved portion 16, at right angles thereto, as shown in Fig. 1. Plunger 8 is normally and resiliently held in engagement in recessed portion 7 of boss 6 by a spring 11 opposite ends of which press against shouldered portion 12 of the plunger and the inner portion of cap 10. Plunger 8 is provided with a suitable handle 13. A suitable reinforcing band 17 may be provided for strengthening the wooden felly 1 at its recessed portion and to support the plunger casing. Mounted in grooved portion 19 of rim 3 is a detachable rim member 18, having a depressed portion 20 engaging in rim 3, as illustrated in Fig. 3.

In the modified form of my invention illustrated in Figs. 5 and 6, which is used on lighter tires, such as might be used for motorcycles, the wooden felly 1 and metal band 2 are replaced by a fixed rim or felly band 1-a, as shown in the drawings.

A suitable number of plungers are provided for each tire, according to its character. On a 4x34 and smaller tires, six plungers are sufficient. On larger tires as many as eight or ten plungers would be required.

The operation of the invention will be understood from an examination of the accompanying drawings.

To remove the tires the plungers are pulled toward the hub of the wheel and turned sufficiently to cause projection 14 of cap 10 to engage in the transverse grooved portion 16 of the plunger and retain it in its inward position, out of engagement with member 3, when the rim may be started by a good jerk with both hands, without the use of a hammer or similar tools. With all the plungers drawn to their outward position, the rim is released so that it may be quickly taken off or put on the wheel. The valve stem extends through an elliptical slot extending through the rims (not illustrated), to allow the valve stem to be readily moved inward or outward enough to loosen rim; so that it can be pulled off from the wheel on the opposite side from the valve stem, and then the valve stem can be slipped out of its slot.

What I claim is:

1. In a dismountable rim having an annular grooved tire-engaging member, a detachable grooved rim member, a metal band disposed between the tire-engaging member and the felly, and a felly, a plurality of radially disposed plunger casings, caps for the casings, said caps having a projection, a plunger mounted in each of the casings, said plunger having a substantially L-shaped groove adapted to receive the projection of the cap, a spring normally pressing the plunger into engagement with the tire-engaging member, and orificed portions for the plunger, whereby the plungers may be quickly secured either in engaged or non-engaged positions relative to the rim.

2. In a dismountable rim an inner tire-engaging member having a series of relatively large bosses spaced at a substantial distance apart, each having a tapered opening, a felly, a metal band disposed between the inner member and the felly and having substantially depressed portions over the bosses, tapered plungers engaging in the bosses, springs bearing on the plunger members, grooved means in the plungers for locking same out of engagement with the bosses to permit of quick dismounting of the rim, and a handle secured to the plunger for withdrawing same from engagement with its boss.

ALBERT J. GLAU.

Witnesses:
HARVEY COY,
HARRY D. COY.

Copies of this patent may be obtained for five cents each, by addressing the "Commissioner of Patents, Washington, D. C."